(12) United States Patent
Tremaine, Sr.

(10) Patent No.: US 7,049,765 B1
(45) Date of Patent: May 23, 2006

(54) TRANSFORMER FOR DIMMER SWITCH OR ON/OFF SWITCH AND METHOD OF USE

(76) Inventor: John M. Tremaine, Sr., 127 Lambert Rd., New Canaan, CT (US) 06840

( * ) Notice: Subject to any disclaimer, the term of this patent is extended or adjusted under 35 U.S.C. 154(b) by 0 days.

(21) Appl. No.: 10/807,727

(22) Filed: Mar. 24, 2004

Related U.S. Application Data

(60) Provisional application No. 60/462,500, filed on Apr. 11, 2003.

(51) Int. Cl.
*H05B 41/16* (2006.01)

(52) U.S. Cl. .............. 315/276; 315/278; 307/140

(58) Field of Classification Search ........ 315/219, 315/276, 278, 284, 291, 307, 362; 307/128, 307/130, 140
See application file for complete search history.

(56) References Cited

U.S. PATENT DOCUMENTS

| | | | |
|---|---|---|---|
| 3,323,013 A | 5/1967 | Lord | 315/187 |
| 3,397,355 A | 8/1968 | Frank | 323/301 |
| 3,728,611 A | 4/1973 | Elvin | 323/343 |
| 4,163,925 A | 8/1979 | Gyursanszky | 315/276 |
| 4,345,188 A * | 8/1982 | Gries et al. | 315/411 |
| 4,367,434 A | 1/1983 | Miller | 315/51 |
| 4,408,154 A | 10/1983 | Cote | 323/340 |
| 4,443,740 A | 4/1984 | Goralnik | 315/284 |
| 4,714,870 A | 12/1987 | Nilsson | 323/258 |
| 4,803,586 A | 2/1989 | Tabor et al. | 367/18 |
| 5,105,127 A * | 4/1992 | Lavaud et al. | 315/291 |
| 5,121,032 A * | 6/1992 | Han | 315/219 |
| 5,289,110 A | 2/1994 | Slevinsky | 323/301 |
| 5,477,113 A * | 12/1995 | Christoffersson | 315/278 |

* cited by examiner

*Primary Examiner*—Trinh Vo Dinh
*Assistant Examiner*—Jimmy Vu
(74) *Attorney, Agent, or Firm*—John H. Crozier

(57) ABSTRACT

The present invention achieves the above objects, among others, by providing, in a preferred embodiment, a transformer system for use with either a dimmer switch or an on/off switch, including: a transformer; a load connected to the transformer; a first tap connected to the transformer to provide a first voltage; and a second tap connected to the transformer to provide a second voltage higher than the first voltage. A method of using the transformer system is also provided.

10 Claims, 2 Drawing Sheets

ELECTRICAL SCHEMATIC
WITH PRIMARY SIDE TAPS

WHEN DIMMER TO BE INSTALLED

WHEN ON/OFF SWITCH TO BE INSTALLED

ELECTRICAL SCHEMATIC WITH PRIMARY SIDE TAPS
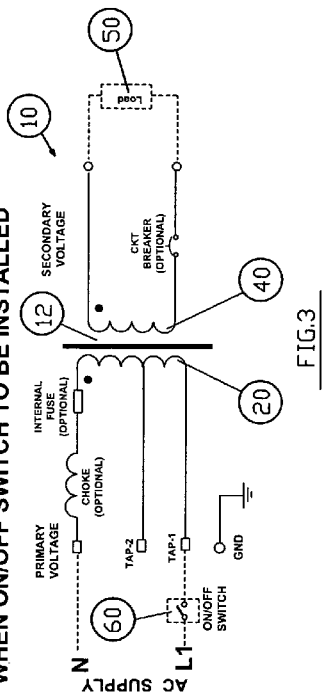
FIG.2 — WHEN DIMMER TO BE INSTALLED
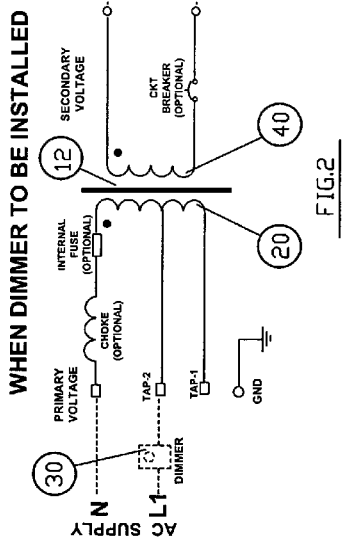
FIG.3 — WHEN ON/OFF SWITCH TO BE INSTALLED
ELECTRICAL SCHEMATIC WITH SECONDARY SIDE TAPS
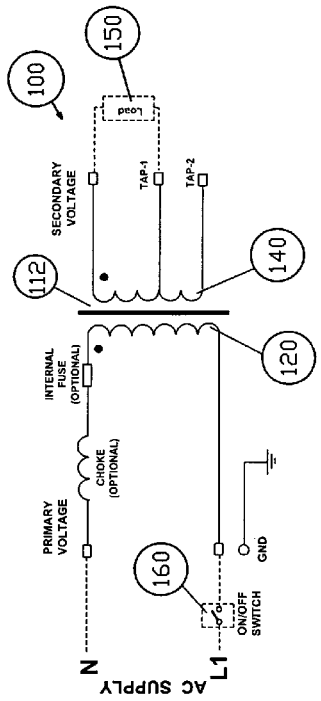
FIG.4 — WHEN DIMMER TO BE INSTALLED
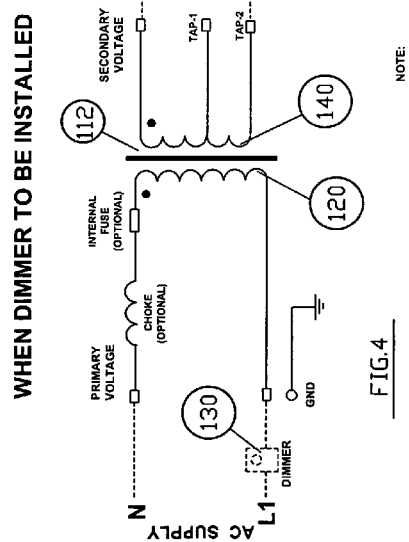
FIG.5 — WHEN ON/OFF SWITCH TO BE INSTALLED
NOTE:
TAP#2 TO BE USED WHEN NEED HIGHER OUTPUT VOLTAGE

US 7,049,765 B1

TRANSFORMER FOR DIMMER SWITCH OR ON/OFF SWITCH AND METHOD OF USE

CROSS-REFERENCE TO RELATED APPLICATION

The present application claims the benefit of the filing date of U.S. Provisional Application Ser. No. 60/462,500, filed Apr. 11, 2003, and titled TRANSFORMER FOR DIMMER SWITCH OR ON/OFF SWITCH AND METHOD OF USE.

BACKGROUND OF THE INVENTION

1. Field of the Invention

The present invention relates to transformers generally and, more particularly, but not by way of limitation, to a novel transformer for use with a dimmer switch or an on/off switch and a method of use thereof.

2. Background Art

A conventional transformer for lighting systems can be used with either a dimmer switch or an on/off switch. A disadvantage of such an arrangement is that when the transformer is used with a dimmer switch, the voltage applied to the lighting system at full input is less than when the same transformer is used with an on/off switch in "ON" position. The result is that the light level output of the lighting system at full output of the dimmer switch is substantially less than that when the transformer is used with an on/off switch in "ON" position.

Accordingly, it is a principal object of the present invention to provide a transformer and method that can be used with either a dimmer switch or an on/off switch and wherein the light level at full output of the lighting system with which the transformer is used is approximately the same with either a dimmer switch or an on/off switch.

A further object of the invention is to provide such a transformer that is economical to construct.

An additional object of the invention is to provide such a method that can be easily implemented.

Other objects of the present invention, as well as particular features, elements, and advantages thereof, will be elucidated in, or be apparent from, the following description and the accompanying drawing figures.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which:

FIG. 2 is schematic of a transformer, with primary side taps, and with a dimmer switch installed in the primary circuit thereof.

FIG. 3 is a schematic of the transformer of FIG. 1, with primary side taps, and with an on/off switch installed in the primary circuit thereof.

FIG. 4 is a schematic of a transformer, with secondary side taps, and with a dimmer switch installed in the primary circuit thereof.

FIG. 5 is a schematic of the transformer of FIG. 3, with secondary side taps, and with an on/off switch installed in the primary circuit thereof.

SUMMARY OF THE INVENTION

Figure 1:
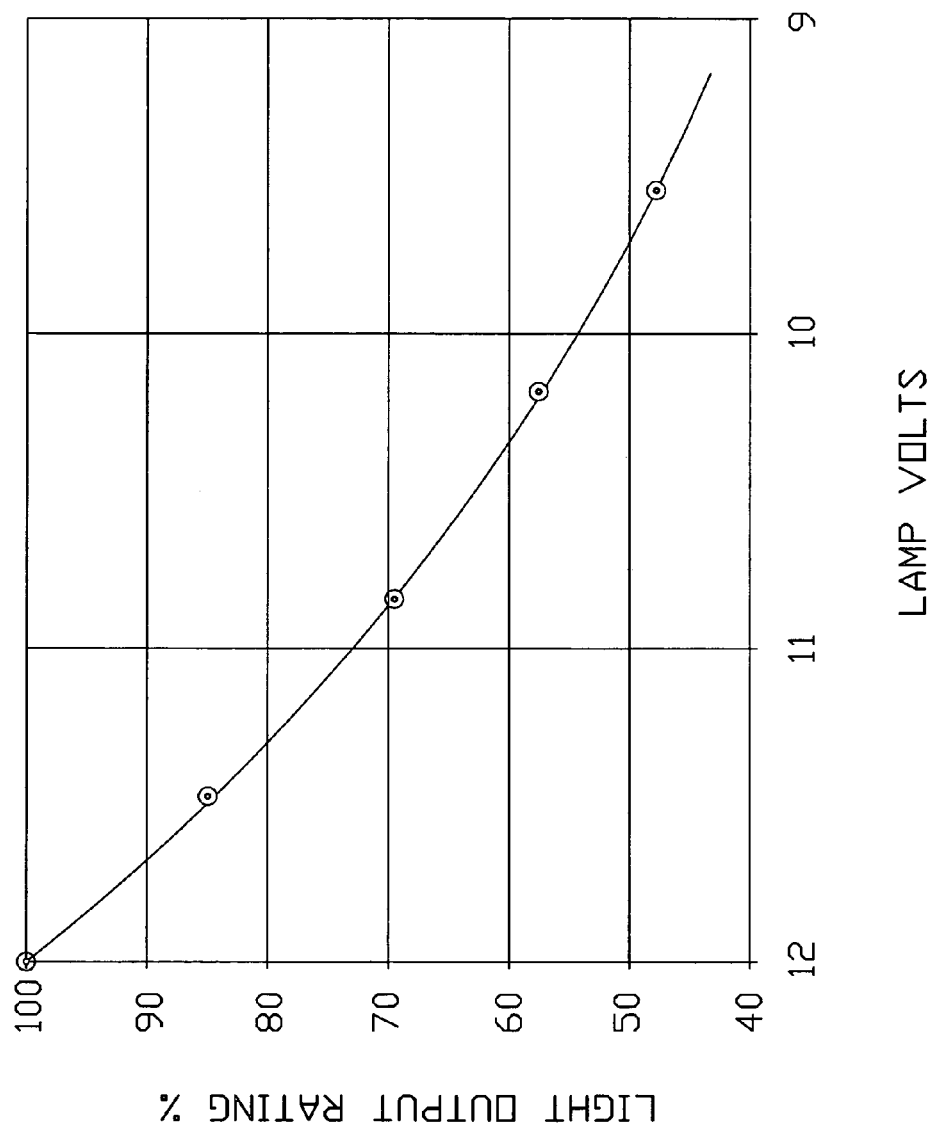
FIG. 1 is a graph of percentage light output vs. lamp voltage.

The present invention achieves the above objects, among others, by providing, in a preferred embodiment, a transformer system for use with either a dimmer switch or an on/off switch, comprising: a transformer; a load connected to said transformer; a first tap connected to said transformer to provide a first voltage; and a second tap connected to said transformer to provide a second voltage higher than said first voltage. A method using said transformer system is also provided.

DETAILED DESCRIPTION OF THE PREFERRED EMBODIMENTS

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

FIG. 1 illustrates the dramatic drop-off in light output as lamp voltage is decreased. Although the light outputs and voltages shown on FIG. 1 are for a nominal 12-volt lamp, provided for illustrative purposes only and not intended to limit the scope of the present invention, the decrease in light output is similar for lamps of other voltages. The output voltage of a lighting industry standard 12-volt transformer is about 11.4 volts at about 120-volt input, giving a light output of about 85 percent of 12 volts when an on/off switch is used, a reasonable level. However, when a dimmer switch is used, the maximum output voltage is about 10.6 when the dimmer switch is at full bright, giving a light output of about 64 percent of rated light output at 12 volts. Thus, a decrease in voltage of about 12 percent from 12-volts has resulted in a light output decrease of about 36 percent of maximum—an undesirable result, which the present invention addresses. It will be understood that the present invention compensates for the loss introduced by a dimmer switch.

FIG. 2 illustrates a transformer system, constructed according to the present invention, and generally indicated by the reference numeral 10. Transformer system includes a transformer 12 having a primary winding 20 with two primary side taps, TAP-1 and TAP-2, and with a dimmer switch 30 connected to TAP-2. The secondary circuit includes a secondary winding 40 and a "LOAD" 50 which may be assumed to be a lighting system.

FIG. 3 illustrates transformer system 10 with an on/off switch 60 connected to TAP-1.

According to the invention, the connections of side taps TAP-1 and TAP-2 to primary winding 20 are selected such that the secondary voltage is higher when dimmer switch 30 is used (FIG. 2) than when an on/off switch 60 is used (FIG. 3), the higher voltage in the first case compensating for the reduction in voltage when dimmer switch 30 is used. Therefore, the same transformer can be used in either case to produce approximately the same lighting level from load 50 regardless of whether dimmer switch 30 is used or on/off switch 60 is used, the voltage compensation being provided when dimmer switch 30 is connected to TAP-2 rather than TAP-1.

FIG. 4 illustrates a transformer system, constructed according to the present invention, and generally indicated by the reference numeral 100. Transformer system 100 includes a transformer 112 having a primary winding 120 that has a dimmer switch 130 connected thereto. Transformer 100 also includes a secondary winding having two secondary side taps TAP-1 and TAP-2. In this case, the load 150, which may be assumed to be a lighting system is connected to TAP-2.

FIG. 5 illustrates transformer system 100 with an on/off switch 160 connected to primary winding 120. In this case, load 150 is connected to TAP-1.

It will be understood, with reference to FIGS. 4 and 5, that TAP-2 is at a higher voltage than TAP-1, the difference compensating for the voltage loss in dimmer switch 130 (FIG. 2), such that the full lighting level of load 150 with dimmer switch 130 is the same as with on/off switch 160 (FIG. 5) in "ON" position.

In either case, the unused tap, TAP-1 or TAP-2, is simply ignored. Thus, the same transformer can be used for either the dimmer switch situation or the on/off switch situation, while providing the same maximum output lighting level from each.

Although FIGS. 2–5 show toroidal transformers, the present invention is applicable as well to other types of conventional transformers, such as laminated and electronic transformers, the toroidal transformers being shown for illustrative purposes only and are not intended to limit the scope of the invention.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A transformer system for use with either a dimmer switch or an on/off switch, comprising:
   (a) a transformer;
   (b) said transformer being arranged such that an output voltage of said transformer across a load, when a dimmer switch is connected to said transformer, is approximately equal to that when an on/off switch is connected to said transformer, to offset a diminution in voltage because of said dimmer switch being connected to said transformer;
   (c) said transformer having a neutral connected to a primary thereof;
   (d) a first tap connected to said primary;
   (e) a second tap connected to said primary intermediate said neutral and said first tap;
   (f) when said dimmer switch is connected to said primary, it is connected between a line and said second tap; and
   (g) when said on/off switch is connected to said primary, it is connected between said line and said first tap.

2. A transformer system for use with either a dimmer switch or an on/off switch, as defined in claim 1, wherein: said transformer is a toroidal transformer.

3. A transformer system for use with either a dimmer switch or an on/off switch, as defined in claim 1, wherein: said transformer is a laminated transformer.

4. A transformer system for use with either a dimmer switch or an on/off switch, as defined in claim 1, wherein: said transformer is an electronic transformer.

5. A transformer system for use with either a dimmer switch or an on/off switch, as defined in claim 1, wherein: said transformer is a laminated transformer.

6. A transformer system for use with either a dimmer switch or an on/off switch, as defined in claim 1, wherein: said transformer is an electronic transformer.

7. A transformer system for use with either a dimmer switch or an on/off switch, comprising:
   (a) a transformer;
   (b) said transformer being arranged such that an output voltage of said transformer across a load, when a dimmer switch is connected to said transformer, is approximately equal to that when an on/off switch is connected to said transformer, to offset a diminution in voltage because of said dimmer switch being connected to said transformer;
   (c) said transformer having a primary with a neutral connected to said primary and with a line connected to said primary; and
   (d) said transformer having a secondary with a common connected to said load and a third tap connected to said secondary;
   (e) a fourth tap connected to said secondary intermediate said common and said third tap;
   (f) when said dimmer switch is connected between said line and said primary, said third tap is connected to said load; and
   (g) when said on/off switch is connected between said line and said primary, said fourth tap is connected to said load.

8. A transformer system for use with either a dimmer switch or an on/off switch, as defined in claim 7, wherein: said transformer is a toroidal transformer.

9. A method of using a transformer system for use with either a dimmer switch or an on/off switch, comprising:
   (a) providing a transformer;
   (b) arranging said transformer such that an output voltage of said transformer across a load, when a dimmer switch is connected to said transformer, is approximately equal to that when an on/off switch is connected to said transformer, to offset a diminution in voltage because of said dimmer switch being connected to said transformer;
   (c) providing said transformer having a neutral connected to a primary thereof;
   (d) providing a first tap connected to said primary;
   (e) providing a second tap connected to said primary intermediate said neutral and said first tap;
   (f) when said dimmer switch is connected to said primary, it is connected between a line and said second tap; and
   (g) when said on/off switch is connected to said primary, it is connected between said line and said first tap.

10. A method of using a transformer system for use with either a dimmer switch or an on/off switch, comprising:
 (a) providing a transformer;
 (b) arranging said transformer such that an output voltage of said transformer across a load, when a dimmer switch is connected to said transformer, is approximately equal to that when an on/off switch is connected to said transformer, to offset a diminution in voltage because of said dimmer switch being connected to said transformer;
 (c) providing said transformer having a primary with a neutral connected to said primary and with a line connected to said primary; and
 (d) providing said transformer having a secondary with a common connected to said load and a third tap connected to said secondary;
 (e) providing a fourth tap connected to said secondary intermediate said common and said third tap;
 (f) when said dimmer switch is connected between said line and said primary, said third tap is connected to said load; and
 (g) when said on/off switch is connected between said line and said primary, said fourth tap is connected to said load.

* * * * *